United States Patent
Collin et al.

(10) Patent No.: US 11,531,732 B2
(45) Date of Patent: *Dec. 20, 2022

(54) SYSTEMS AND METHODS FOR PROVIDING IDENTITY ASSURANCE FOR DECENTRALIZED APPLICATIONS

(71) Applicant: REFINITIV US ORGANIZATION LLC, New York, NY (US)

(72) Inventors: Richard Collin, East Sussex (GB); Robert John Lundie Hill, Hertfordshire (GB); Mihai Cimpoesu, London (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,356

(22) Filed: Mar. 24, 2020

(65) Prior Publication Data

US 2020/0242218 A1 Jul. 30, 2020

Related U.S. Application Data

(63) Continuation of application No. 15/696,996, filed on Sep. 6, 2017, now Pat. No. 10,635,790.

(Continued)

(51) Int. Cl.
*G06F 21/30* (2013.01)
*H04L 9/40* (2022.01)
(Continued)

(52) U.S. Cl.
CPC ............ *G06F 21/30* (2013.01); *H04L 9/3236* (2013.01); *H04L 9/3247* (2013.01); *H04L 63/0892* (2013.01); *H04L 9/50* (2022.05)

(58) Field of Classification Search
CPC ............ G06N 3/00; G06N 3/006; G06N 5/04; G06N 5/046; G06F 21/30; H04L 63/0892;
(Continued)

(56) References Cited

U.S. PATENT DOCUMENTS 6,850,985 B1 2/2005 Giloi et al.
10,108,954 B2 10/2018 Dunlevy et al.
(Continued)

FOREIGN PATENT DOCUMENTS

CN 104320262 A 1/2015
CN 105488665 A 4/2016
(Continued)

OTHER PUBLICATIONS

International Search Report and Written Opinion dated Nov. 27, 2017, of the corresponding International Application PCT/IB2017/055381 filed Sep. 6, 2017, 14 pages.
(Continued)

*Primary Examiner* — Abu S Sholeman
(74) *Attorney, Agent, or Firm* — Norton Rose Fulbright US LLP

(57) ABSTRACT

An embodiment of a method of providing identity assurance for a decentralized application (DApp) includes executing, by at least one distributed node of a blockchain system, an entitlement contract stored on the blockchain to perform a read call from a DApp contract stored on the blockchain, the read call including an address signing a transaction to the DApp contract. Performing the read call may include reading a list of registered addresses stored on the blockchain, determining whether the list includes the signing address; and providing an output indicating whether the list includes the signing address. The method may further include executing, by the at least one distributed node, a registry contract
(Continued)

stored on the blockchain to perform a read call from the DApp contract, the read call including an identifier of the decentralized application. Performing the read call may include reading a list of registered applications stored on the blockchain; determining whether the list includes the identifier; and if so, providing an output indicating an address of the entitlement contract.

22 Claims, 4 Drawing Sheets

Related U.S. Application Data

(60) Provisional application No. 62/384,980, filed on Sep. 8, 2016.

(51) Int. Cl.
*H04L 9/32* (2006.01)
*H04L 9/00* (2022.01)

(58) Field of Classification Search
CPC .. H04L 9/3247; H04L 9/3236; H04L 2209/38
See application file for complete search history.

(56) References Cited

U.S. PATENT DOCUMENTS

| | | | | |
|---|---|---|---|---|
| 10,979,410 | B1* | 4/2021 | Byrd | H04L 63/061 |
| 2004/0044895 | A1* | 3/2004 | Reasons | H04L 63/0442 |
| | | | | 713/182 |
| 2015/0324764 | A1 | 11/2015 | Van Rooyen et al. | |
| 2016/0117657 | A1 | 4/2016 | Forbes, Jr. et al. | |
| 2016/0335533 | A1* | 11/2016 | Davis | G06F 9/44 |
| 2017/0116693 | A1* | 4/2017 | Rae | G06Q 50/184 |
| 2017/0300898 | A1* | 10/2017 | Campero | G06Q 20/3676 |
| 2017/0344988 | A1* | 11/2017 | Cusden | G06F 21/00 |
| 2017/0352116 | A1* | 12/2017 | Pierce | H04L 63/10 |
| 2017/0353309 | A1 | 12/2017 | Gray | |
| 2017/0372300 | A1* | 12/2017 | Dunlevy | G06F 21/645 |
| 2019/0036692 | A1 | 1/2019 | Sundaresan et al. | |
| 2019/0080407 | A1 | 3/2019 | Molinari et al. | |
| 2019/0190724 | A1 | 6/2019 | Sundaresan et al. | |
| 2019/0197532 | A1 | 6/2019 | Jayachandran et al. | |

FOREIGN PATENT DOCUMENTS

| | | |
|---|---|---|
| CN | 105488675 A | 4/2016 |
| CN | 105573828 A | 5/2016 |
| CN | 105592098 A | 5/2016 |
| CN | 108292331 A | 7/2018 |

OTHER PUBLICATIONS

Azaria et al., "MedRec: Using Blockchain for Medical Data Access and Permission Management", 2016 2nd International Conference on Open and Big Data (OBD), IEEE, Aug. 22, 2016 (Aug. 22, 2016), pp. 25-30, XP032969608.

Wood, "Ethereum: A Secure Decentralised Generalised Transaction Ledger Final Draft—Under Review", Jun. 4, 2014 (Jun. 4, 2014), XP055242189, URL:http://gavwood.com/paper.pdf.

Aracic, "Ethereum Usecase: Online Identitatsprufung-Blockchainers", Mar. 29, 2016 (Mar. 29, 2016), pp. 1-6, XP055424742, URL:http://blockchainers.org/index.php/201 6/03/29/ethereum-usecase-online-identity-check.

* cited by examiner

SYSTEMS AND METHODS FOR PROVIDING IDENTITY ASSURANCE FOR DECENTRALIZED APPLICATIONS

CROSS REFERENCE TO RELATED APPLICATIONS

This application is a continuation of, and claims priority to, U.S. patent application Ser. No. 15/696,996, filed on Sep. 6, 2017, which claims priority to U.S. Provisional Patent Application No. 62/384,980, filed on Sep. 8, 2016, each of which are hereby incorporated by reference in their entireties.

BACKGROUND INFORMATION

Decentralized applications, in which a client component interfaces with a distributed component stored in a blockchain system, are an increasingly popular form of application due to benefits provided by the underlying architecture, such as freedom from the necessity of a centralized clearing authority, increased resistance to subversive attacks, etc. In some of these applications, the distributed component includes a set of program instructions, also referred to as a contract or smart contract, stored in the blockchain system, which may be executed in response to a transaction addressed to the contract.

However, implementations of such applications to date have suffered from problems. Typically, the distributed component, such as the smart contract, accepts transactions from an address, with the user behind the address being unknown to the component. This presents potential security and efficiency risks, as a subset of these transactions may be of a malicious or otherwise undesirable form, which may seek to use the decentralized application in an unauthorized manner, such as to steal assets stored in the blockchain system, attack other applications or components of the blockchain system, disrupt operation of the decentralized application or other components of the blockchain system, etc.

Thus, a need exits for systems and methods to enable decentralized application to execute only authorized transactions.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Embodiments of an identity assurance system provide improved identity services for decentralized applications operating in the context of a blockchain system.

The identity assurance system may include one or more components in the blockchain system to enable the decentralized application to process only authorized transactions. An entitlement contract of the identity assurance system may provide an indication to a contract of the decentralized application of whether an address signing a transaction is authorized to conduct the transaction. To verify the address, the entitlement contract may store, maintain and consult a list of addresses authorized to conduct transactions with the decentralized application.

A registry contract of the identity assurance system may provide an indication to the contract of the decentralized application of the location of the entitlement contract within the blockchain. To provide the location, the registry contract may store, maintain and consult a list of registered applications and corresponding entitlement contracts.

The identity assurance system thus provides entitlement checking to improve the security and efficiency with which the decentralized application and the blockchain system operate by reducing their exposure to unauthorized transactions and thereby maintaining an operative status of the decentralized application and blockchain system and reserving their processing power for desired transactions. The entitlement checking functions provided by the identity assurance system may operate within the blockchain system itself, again improving security and efficiency of the system by reducing communications off chain and providing immutability to address and application registries. Similarly, the identity assurance system enables a user associated with an authorized address to execute restricted functions of the decentralized application without revealing the identity of the user to the decentralized application, thereby maintaining the privacy of the user while providing identity assurance to the decentralized application.

The identity assurance system also may include a wallet interface to generate transactions for the contract of the decentralized application. The wallet interface may download a decryption module and one or more encrypted keys to a user system, decrypt the keys using the decryption module, and sign transactions using the decrypted keys. The wallet interface thus provides improved security to the user, decentralized application and blockchain system by limiting exposure of the unencrypted keys to only the user's system.

Figure 1:
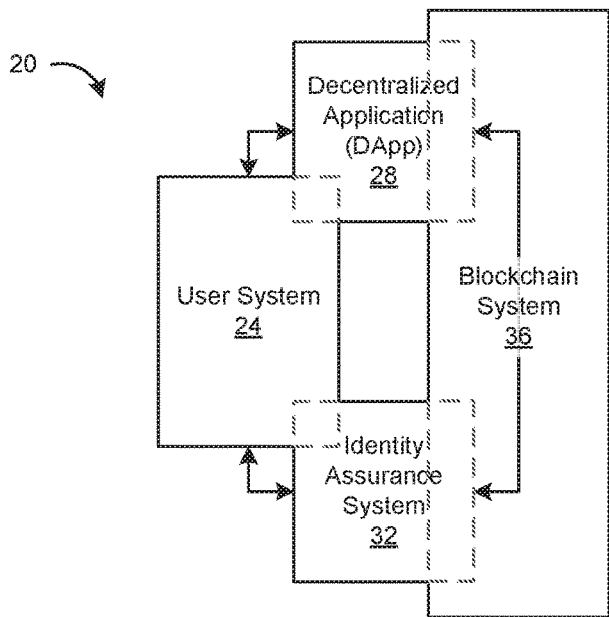
FIG. 1 is a schematic diagram depicting an embodiment of a system for conducting authorized transactions by a decentralized application on a blockchain.

FIG. 1 depicts an exemplary embodiment of a system 20, for conducting transactions by a decentralized application, including a user system 24, the decentralized application 28, an identity assurance system 32, and a blockchain system 36. A user of the user system 24 uses the decentralized application 28 to engage services that the application provides. The decentralized application 28 may provide a wide variety of such services, such as related to conducting financial transactions, providing business productivity tools, gaming, etc. The identity assurance system 32 enables the decentralized application 28 to execute only authorized transactions, and thus provide increased security, efficiency, etc. for the decentralized application 28 and blockchain system 36. The blockchain system 36 implements a distributed transaction ledger utilized by components of the decentralized application 28 and identity assurance system 32.

Figure 2:
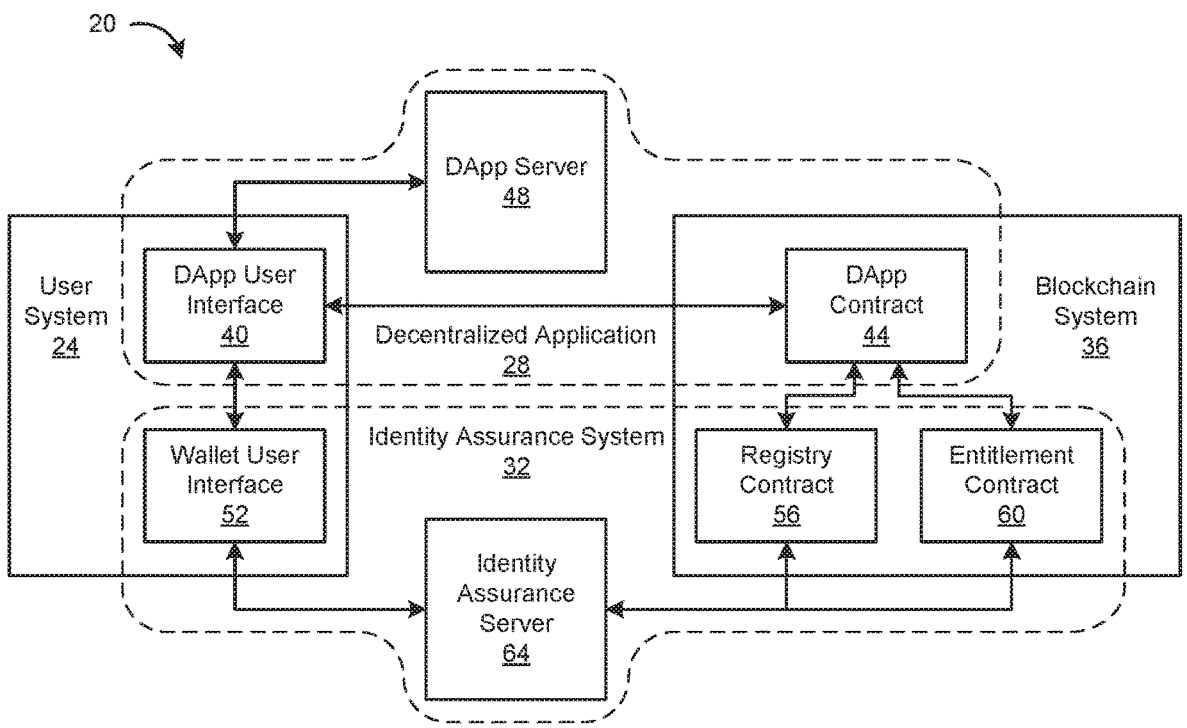
FIG. 2 is a schematic diagram depicting an embodiment of the system for conducting authorized transactions, showing in greater detail embodiments of a decentralized application and an identity assurance system.

FIG. 2 depicts an exemplary embodiment of the system 20 for conducting authorized transactions showing embodiments of the decentralized application 28, identity assurance system 32, and blockchain system 36 in greater detail. The decentralized application (DApp) 28 includes client, distributed and server components. A user interface of the decentralized application (DApp user interface) 40 executes on the user, i.e., client, system 24 to provide an interface to services of the decentralized application 28. A smart contract of the decentralized application (DApp contract) 44 is stored on a blockchain of the blockchain system 36. The DApp contract 44 includes program instructions to be executed by distributed nodes of the blockchain system 36 to conduct transactions received from the DApp user interface 40 to perform services of the decentralized application 28. A server of the decentralized application (DApp server) 48 serves components to the user system for execution as the DApp user interface 40. For example, the DApp user interface 40 may execute in a browser program on the user system using Internet technologies such as HTML, Javascript, CSS, etc.

The identity assurance system 32 also includes client, distributed and server components. A wallet user interface 52 provides identity services to the DApp user interface for generating transactions to the decentralized application, such as key decryption, transaction signing, etc. for registered users. One or more registry and/or entitlement contracts of the identity assurance system 56, 60 are stored in the blockchain system 36. The contracts 56, 60 includes program instructions to be executed by distributed nodes of the blockchain system 36 to enable the decentralized application 28 to execute only authorized transactions. An identity assurance server 64 provides encryption/decryption and key services to the wallet user interface 52 for generating the transactions, and contract services for creating and maintaining the contracts 56, 60 in the blockchain system 36.

In other embodiments, the decentralized application 28, identity assurance system 32 and blockchain system 36 may include only any subset of the components or features depicted in or discussed in regard to FIG. 2 or otherwise discussed herein.

Figure 3:
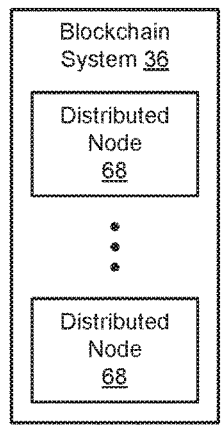
FIG. 3 is a schematic diagram depicting an embodiment of a blockchain system.

FIG. 3 depicts an exemplary embodiment of the blockchain system 36 including a plurality of distributed nodes 68. The distributed nodes 68 are organized as a peer-to-peer network, in which each of the nodes 68 may connect to one or more of the other nodes 68 using a peer-to-peer communication protocol. At least one or some of the distributed nodes 68 also connect to components of the user system 24 and/or components of the identity assurance system 32.

Figure 4:
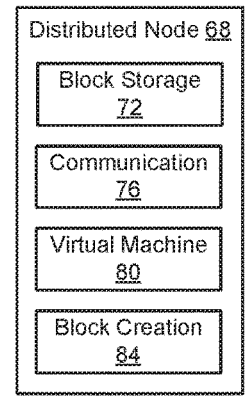
FIG. 4 is a schematic diagram depicting an embodiment of a distributed node of the blockchain system.

FIG. 4 depicts an exemplary embodiment of the distributed node 68 of the blockchain system, including a block storage module 72, a communication module 76, a virtual machine module 80 and a block creation module 84. The block storage module 72 stores blocks of the blockchain of the blockchain system 36. The communication module 76 performs communications between the distributed node 68 and other distributed nodes 68 and/or components of the user system 24 and/or the identity assurance system 32. The virtual machine module 80 executes contracts stored on the blockchain of the blockchain system 36. The block creation module 84 performs an algorithm to incorporate transactions into blocks of the blockchain of the blockchain system 36, also referred to as mining blocks of the blockchain. In embodiments, one or more of the distributed nodes 68 of the blockchain system include only selected subsets of the components depicted in FIG. 4, so as to perform only corresponding subsets of the functions performed by the included modules.

Components of the identity assurance system 32, decentralized application 28, blockchain system 36 and user system 24 may be implemented as hardware, software, or a mixture of hardware and software. For example, each of the user system 24, identity assurance server 64, DApp server 48, and nodes 68 of the blockchain system 36, and/or any individual one, subset, or all of the components thereof, may be implemented using a processor and a non-transitory storage medium, where the non-transitory machine-readable storage medium includes program instructions, which when executed by the processor perform embodiments of the functions of such components discussed herein.

In one embodiment, the user system 24 may be a computer system, such as, e.g., a desktop computer, laptop computer, mobile computing device, etc. owned or operated the user; the DApp server 48 and identity assurance server 64 may be computer systems, such as, e.g., an Internet server, cloud server, etc., owned or operated by the DApp owner and identity assurance provider, respectively; the distributed nodes 68 of the blockchain system each may be a computing system, such as, e.g., a desktop computer, laptop computer, mobile computing device, network device, server, cloud server, etc., owned or operated by the identity service provider or another entity or entities.

The identity assurance system 32 provides identity services to the decentralized application 28 to enable the decentralized application 28 to conduct only authorized transactions. Embodiments of the identity assurance system 32 provide identity services in the context of both wallet functions to generate signed transactions and entitlement functions to register and verify authorized addresses and/or users.

Figure 5:
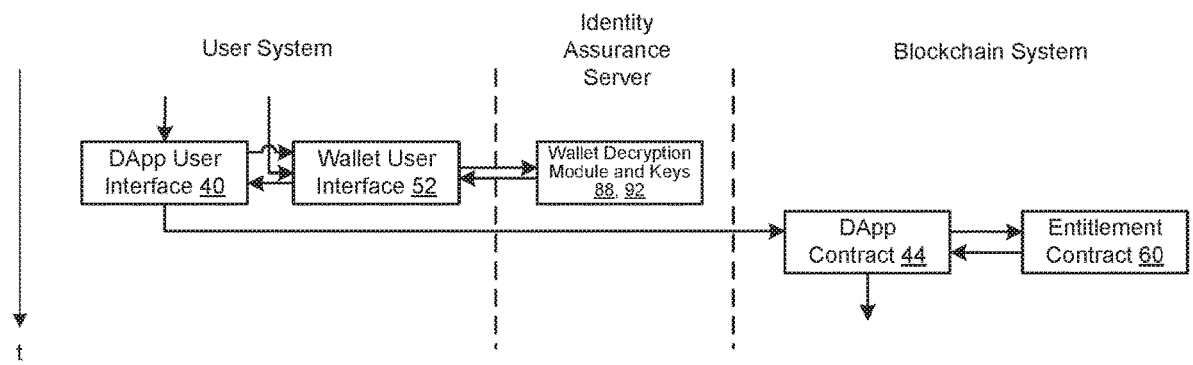
FIG. 5 is a flow diagram depicting an embodiment of transaction and entitlement checking functions of the decentralized application and identity assurance system.

FIG. 5 is a flow diagram depicting an exemplary embodiment of identity services provided by the identity assurance system 32 for performing wallet and entitlement functions over time and sorted by component. Initially, the DApp user interface 40 receives an input from the user at the user system 24 requesting a service or function of the decentralized application 28 requiring a signed transaction be sent to the DApp contract 44. A wallet component embedded in the DApp user interface 40 intercepts an as yet unsigned transaction and launches the wallet user interface 52, which may execute in a separate window.

If the user is already registered with the identity assurance system 36, the wallet user interface 52 requests and downloads a decryption module and one or more encrypted keys of the user from a decryption module and key storage components 88, 92 of the identity assurance server 64. If the user is not yet registered with the identity assurance system 32, the wallet user interface 52 first launches a process to register the user, as discussed further below. The wallet user interface 52 then requests that the user enter a password, and if the password is correctly entered, decrypts the encrypted key using the downloaded decryption module, signs the transaction using the decrypted key, and passes the signed transaction back to the DApp user interface 40.

The DApp user interface 40 then transmits the signed transaction addressed to the DApp contract 44 to at least one distributed node 68 of the blockchain system 36. As part of a process of mining blocks of the blockchain system 36, at least one of the distributed nodes 68 executes the DApp contract 44 to process the transaction.

If during execution of the DApp contract 44, the transaction invokes one or more predetermined restricted functions of the DApp contract 44 designated for access only by authorized addresses, the DApp contract 44 invokes an entitlement checking function of the DApp contract 44 to check whether the address signing the transaction is authorized to invoke the predetermined function. The predetermined functions may include functions of the DApp contract 44 deemed to represent a security risk if executed by unauthorized addresses. For example, in embodiments, the predetermined functions include any functions of the DApp contract 44 that modify data stored by the DApp contract 44 on the blockchain.

The entitlement checking function of the DApp contract 44 executes a read call of an entitlement contract 60 of the identity assurance system 36 to determine if the address signing the transaction is authorized to execute the invoked predetermined function of the DApp contract 44. The read call returns as an output an indication of whether the address is authorized to invoke the predetermined function. If the address is authorized to invoke the predetermined function, the DApp contract 44 continues execution to perform the invoked function.

Execution by the DApp contract of the predetermined restricted function enables performance of selected activities by the decentralized application 28, in embodiments including one or more of: conducting a financial transaction in the name of the address signing the transaction (such as a financial transaction between the user using the address and a second user); transferring ownership of an asset (such as a digital or physical asset) in the name of the address signing the transaction (such as transferring ownership of the asset to or from the user using the address from or to the second user); presenting a pay per view or pay per play media environment (such as a video or game) to the user system; or causing an electronic device (such as a control circuit) to generate an electrical signal to control a mechanical operation of an apparatus (such as an air conditioner, fan, refrigerator, a combustion engine, etc.) or to control an electrical operation of an apparatus (such as one or more of another circuit, a computing device, an electric motor, a hybrid engine, etc.).

The identity services provided by the identity assurance system 32 thus enable a user associated with an authorized address to execute restricted functions of the DApp contract 44 without revealing the identity of the user to the decentralized application 28, thereby maintaining the privacy of the user while providing identity assurance to the decentralized application 28. That is, as long as the user has registered with the identity services, e.g., as discussed further below in regard to the embodiment of FIG. 11, the decentralized application 28 receives identity assurance with respect to the user via the entitlement checking of the identity services, etc., while allowing the user's identity to remain concealed from the decentralized application 28.

In other embodiments, the method(s) of providing identity services depicted in or discussed in regard to FIG. 5 may include only any subset of the steps of such method(s).

Figure 6:
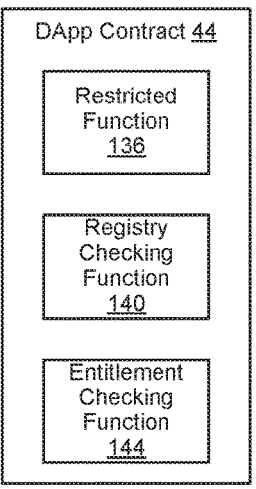
FIG. 6 is a schematic diagram depicting an embodiment of a contract of the decentralized application.

FIG. 6 depicts an exemplary embodiment of the DApp contract 44 including one or more restricted functions 136, an entitlement checking function 140, and a registry checking function 144.

As discussed above, the restricted functions 136 may be invoked by a transaction to the DApp contract 44 to invoke the functionality implemented by these functions. The restricted functions 136 are functions of the DApp contract 44 for which execution is restricted to only authorized addresses. The restricted functions 136 may be functions of the DApp contract 44 which represent the greatest risk by unauthorized execution. In embodiments, the restricted functions 136 include at least one function of the DApp contract 44 that modifies data stored by the contract 44 on the blockchain, such as each of the functions of the DApp contract 44 that modify such data.

The entitlement checking function 140 executes a read call to the entitlement contract 60 to determine if the address signing the transaction is authorized to execute the restricted function 136. The entitlement checking function 140 receives the signing address as an input, provides the signing address to the entitlement contract 60 in the read call, and provides an indication of whether the address is authorized to invoke the restricted function 136 as an output.

In embodiments, the identity assurance system 32 provides a separate corresponding entitlement contract 60 for each decentralized application 28. The registry checking function 140 of the DApp contract 44 executes a read call to a registry contract 56 of the identity assurance system 32 to determine an address of the entitlement contract 60 corresponding to the decentralized application 28. The registry checking function 144 receives an identifier identifying the decentralized application 28 as an input, provides the identifier to the registry contract 56 in the read call, and provides an indication of whether a corresponding entitlement contract 60 exists for the decentralized application 28 and, if so, the address of the corresponding entitlement contract 60 on the blockchain as an output.

Figure 7:
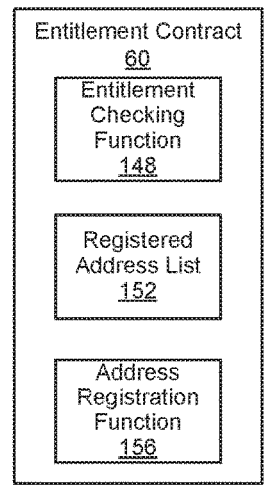
FIG. 7 is a schematic diagram depicting an embodiment of an entitlement contract of the identity assurance system.

FIG. 7 depicts an exemplary embodiment of the entitlement contract 60 including an entitlement checking function 148, a registered address list 152, and an address registration function 156.

The entitlement checking function 148 is a read call of the entitlement contract 60 that determines if an address included with the read call is in the list of registered addresses 152. The entitlement checking function 148 receives the address to be checked as an input, reads the list of registered addresses 152 stored by the entitlement contract 60, and provides as an output an indication of whether the address is in the list of registered addresses 152. As a read call, the entitlement checking function 148 may be executed by directly executing the entitlement contract 60 by the distributed node 68 executing the DApp contract 44 without transmitting a transaction containing the read call to a distributed node 68 for execution.

The registered address list 152 is a data structure stored by the entitlement contract 60 on the blockchain containing a list of addresses authorized to execute the restricted functions 136 of the DApp contract 44. Functions of the entitlement contract 60, such as the entitlement checking function 148 and address registration function 156, selectively read or write to the registered address list 152, respectively. Alternatively or in addition to storing a list of authorized addresses, in embodiments, the list 152 may store an indicator of a user generating the transaction other than the address signing the transaction, such as an identifier of the user, and the entitlement checking functions 144, 148 of the DApp contract 44 and entitlement contract 60 may operate on the basis of checking this indicator against the list of registered indicators.

The address registration function 156 is invoked by a transaction addressed to the entitlement contract 60 to add or remove registered addresses to or from the list of registered addresses 152. The address registration function 156 receives an address as an input, and adds or removes the address to or from the list of registered addresses 152 as a result. The address registration function 156 is a restricted function of the entitlement contract 60, accessible only to a wallet or address of the identity assurance system 32. In embodiments, the entitlement contract 60 may include a single address registration function 156 to both add and remove addresses to and from the registered address list 152, or alternatively a plurality of address registration functions 156, such as a first address registration function to add addresses to the list of registered addresses 152, and a second address registration function to remove addresses from the list of registered addresses 152.

In embodiments, the entitlement contract 60 may provide a more detailed indication of whether an address is authorized to use a restricted function 136. For example, the entitlement contract 60 may store in the registered list 152 one or more of a role of a registered address or which selected ones of a plurality of different restricted functions the address is authorized to invoke. In such embodiments, the entitlement checking functions 144, 148 may return an indication of the one or more of the role of the address or which functions the address is entitled to invoke.

Figure 8:
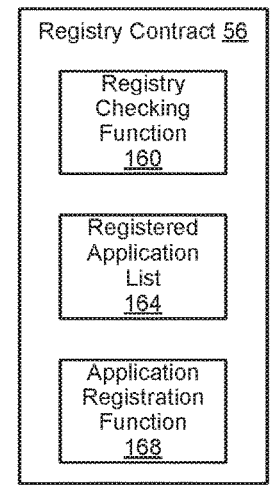
FIG. 8 is a schematic diagram depicting an embodiment of an registry contract of the identity assurance system.

FIG. 8 depicts an exemplary embodiment of the registry contract 56 including a registry checking function 160, a registered application list 164, and an application registration function 168.

The registry checking function 160 is a read call of the registry contract 56 to determine if an address included with the read call is in the list of registered applications 164. The registry checking function 160 receives an identifier of the decentralized application 28, such as an address of the application 28 on the blockchain, as an input, reads a list of registered applications 164 stored by the registry contract 56, and, if the identifier is contained in the list 164, provides as an output an address of an entitlement contract 60 stored in the list 164 corresponding to the application 28. Similar to as discussed above, as a read call, the registry checking function 160 may be executed by the distributed node 68 executing the DApp contract 44 by directly executing the registry contract 56 without transmitting a transaction containing the read call to a distributed node 68 for execution.

The registered application list 164 is a data structure stored by the registry contract 56 on the blockchain containing a list of registered applications and corresponding entitlement contract addresses. Functions of the registry contract 56, such as the registry checking function 160 and application registration function 168, may read from or write to the registered application list 164, respectively.

The application registration function 168 is invoked by a transaction addressed to the registry contract 56 to add or remove applications to or from the list of registered applications 164. The application registration function 168 receives an identifier of an application, and, in the case of adding an application, a corresponding entitlement contract address, as input, and adds or removes the application and corresponding entitlement contract address to or from the list of registered applications as a result. The application registration function 168 is a restricted function, accessible only to a wallet or address of the identity assurance system 32. In embodiments, the registry contract 56 may include a single application registration function 168 to both add and remove applications 28 to and from the registered application list 164, or alternatively a plurality of application registration functions 168, such as a first application registration function to add applications 28 to the list of registered applications 164, and a second application registration function to remove applications 28 from the list of registered applications 164.

In other embodiments, the DApp contract 44, entitlement contract 60, and registry contract 56 may include only any subset of the components or features depicted in or discussed in regard to FIGS. 6, 7 and 8.

Figure 9:
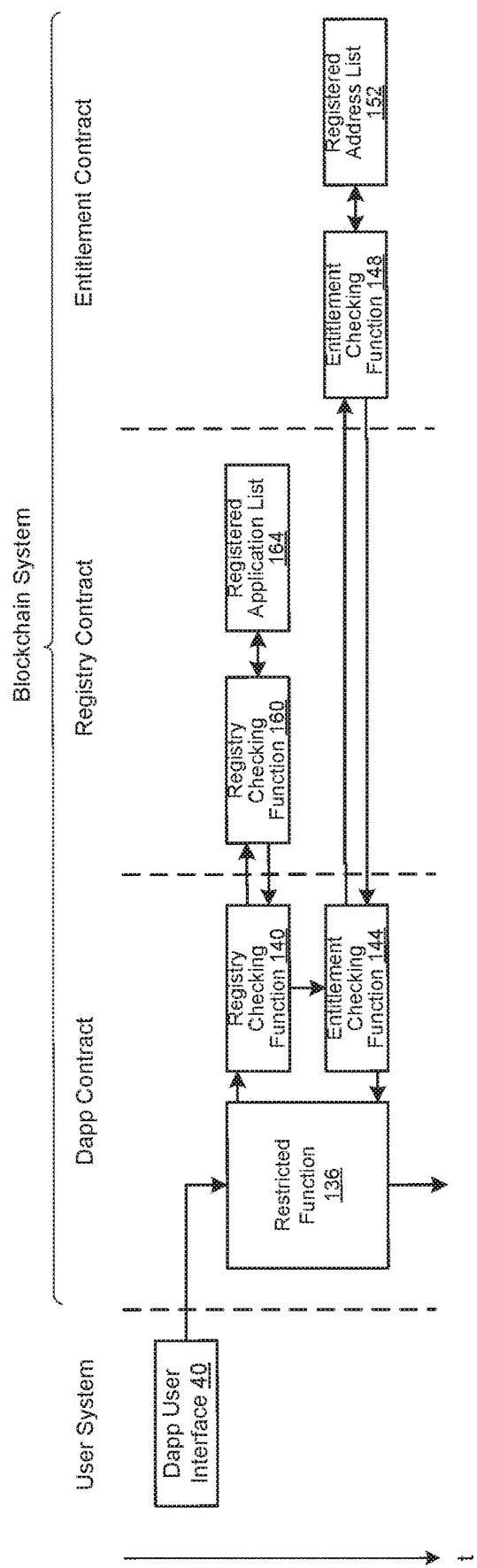
FIG. 9 is a flow diagram depicting an embodiment of transaction, registry checking, and entitlement checking functions of the decentralized application and identity assurance system.

FIG. 9 is a flowchart showing an exemplary embodiment of providing identity assurance services to the decentralized application 28, showing functions of the DApp contract 44, entitlement contract 60 and registry contract 56 in greater detail.

The DApp user interface 40 transmits to at least one distribute node 68 of the blockchain system 36 a transaction addressed to the DApp contract 44 invoking one of the restricted functions 136 of the DApp contract 44. As part of the creation of new blocks of the blockchain, the DApp contract 44 is executed by at least one distributed node 68 to process the transaction.

Invoking the restricted function 136 of the DApp contract 44 by the transaction causes the DApp contract 44 to invoke the registry checking function 140 of the DApp contract 44. As discussed above, invoking the registry checking function 140 executes a read call to the registry contract 56 including an identifier of the DApp contract 44. The read call to the registry contract 56 invokes the registry checking function 160 of the registry contract 56, which reads the registered application list 164 of the registry contract 56, and, if the indicated application 28 is contained in the registered application list 164, returns an address of the entitlement contract 60 corresponding to the decentralized application 28, or else returns an indication that the application 28 is not registered.

The DApp contract 44 then invokes the entitlement checking function 144 of the DApp contract 44, with the returned address of the entitlement contract 60 and the signing address of the transaction invoking the restricted function 136 as inputs. As discussed above, invoking the entitlement checking function 144 executes a read call to the entitlement contract 60 including the signing address. The read call invokes the entitlement checking function 148 of the entitlement contract 60, which reads the registered address list 152 of the entitlement contract, and, if the signing address is contained in the registered address list 152, returns an indication that the signing address is authorized to invoke the restricted function 136, or else returns an indication that the signing address is not authorized to invoke the restricted function 136.

If the entitlement checking function 144 returns that the signing address is authorized to invoke the restricted function 136, the DApp contract 44 then proceeds to execute the restricted function 136 to process the transaction. By contrast, if the entitlement checking function 144 returns that the signing address is not authorized to invoke the restricted function 136, the DApp contract 44 aborts processing the transaction.

Figure 10:
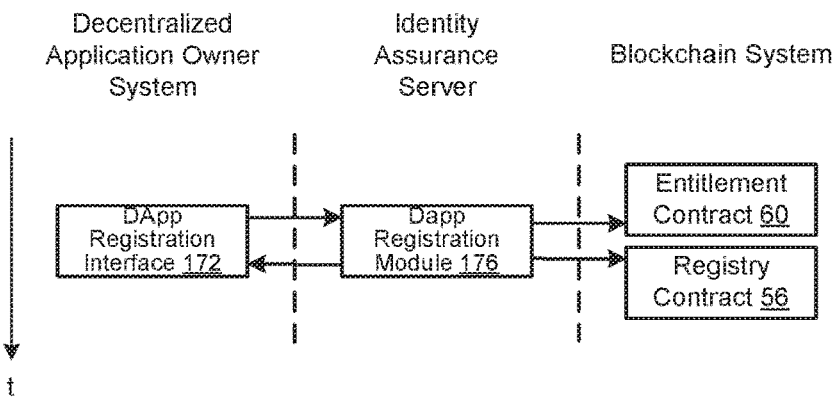
FIG. 10 is a flow diagram depicting an embodiment of a registration of the decentralized application with the identity assurance system.

In other embodiments, the method(s) of providing identity services depicted in or discussed in regard to FIG. 10 may include only any subset of the steps of such method(s).

The identity assurance system 32 may provide an interface for registration of the decentralized application 28 for the identity services discussed herein. FIG. 10 is a flowchart depicting an exemplary embodiment of registration of the decentralized application over time and sorted by component.

An owner of the decentralized application 28 accesses an application registration user interface 172 using an owner system. The application registration user interface 172 may be served to the owner system by the identity assurance server 64. Through the application registration user interface 172, the owner of the decentralized application 28 provides an identification of the decentralized application 28, such as a name of the application 28 and/or an address of the DApp contract 44 of the application 28 on the blockchain, and terms of use for the user of the application 28, to an application registration module 176 of the identity assurance system 32, such as executing on the identity assurance server 64.

In response, the application registration module 176 creates an entitlement contract 60 corresponding to the decentralized application 28, and generates and transmits a transaction to the blockchain system deploying the generated entitlement contract 60 to the blockchain. The registration module 176 also generates and transmits to the blockchain system a transaction addressed to the registry contract 56 to write the identifier of the decentralized application 28 and the address of the corresponding entitlement contract 60 to the registered application list 164 of the registry contract 56.

The registration component 176 then returns a confirmation of registration and an identity assurance module to the decentralized application owner via the registration user interface 172. The identity assurance module includes program instructions to implement aspects of the identity assurance system discussed herein within the DApp user interface 40 and DApp contract 44, such as program instructions to implement triggering the wallet user interface 52, registry checking function 140, and entitlement checking function 144. The decentralized application owner may incorporate the program instructions from the identity assurance module into the DApp user interface 40 and DApp contract 44.

In embodiments, the identity assurance system 32 may optionally omit the registry contract 56 and the associated functionality discussed above and include only one or more entitlement contracts 60 for a decentralized application 28. In such embodiments, the DApp contract 44 may itself contain an address for the entitlement contract 60 in program instructions of the DApp contract 44, and thus be enabled to address the corresponding entitlement contract 60 without first consulting a registry contract.

In different embodiments, a single decentralized application may consult a corresponding single entitlement contract, a plurality of decentralized applications may consult a single entitlement contract, or a single decentralized application may consult a plurality of entitlement contracts.

Figure 11:
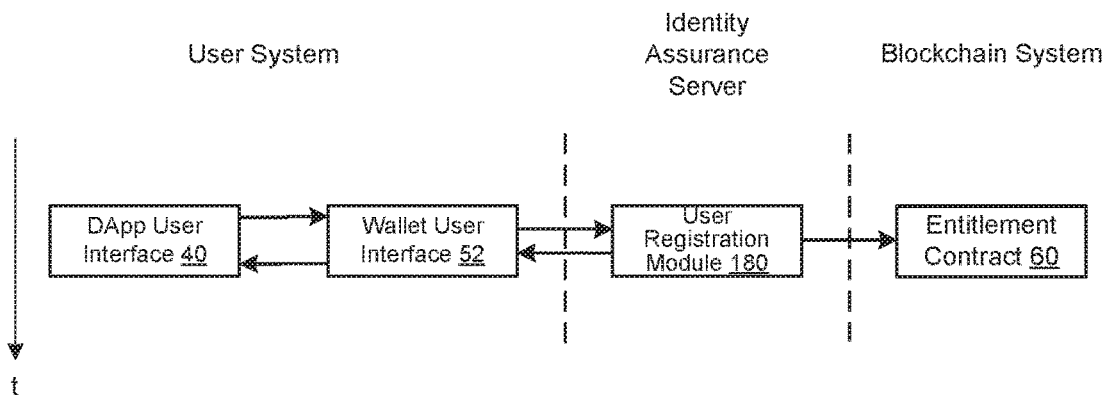
FIG. 11 is a flow diagram depicting an embodiment of a registration of a user with the identity assurance system.

The identity assurance system 32 may provide an interface for registration of a user for the identity services discussed herein. FIG. 11 is a flowchart depicting an exemplary embodiment of providing registration of the user over time and sorted by component.

When the DApp user interface 40 triggers the launching of the wallet user interface 52 to sign a transaction, as discussed above, the wallet user interface 52 determines if the user is registered with the identity assurance system 32. If the user is not yet registered, the wallet user interface 52, or another interface launched by the wallet user interface 52, performs a registration of the user.

To register the user within the identity assurance system 32, the wallet interface 52 or other interface requests and transmits identification information from the user to a user registration component 180 of the identity assurance system, such as executed by the identity assurance server 64. The identification information may include an identifier of an identity provided by an identify provider. The user registration component 180 authenticates or trigger authentication of the user information. The authentication of the user information may be performed either by the user registration component 180 or by an identity provider system, such as a government, corporate or other identity provider system, which issued the identity provided by the user which is being authenticated. Upon authentication of the user information, the user registration component 180 registers the user and transmits a confirmation back to the user via the interface 52.

The user also may request to be registered as an authorized user of the restricted functions 136 of the decentralized application 28. To register the user as an authorized user, the user is presented with the terms of use of the decentralized application 28 via the interface 52 from the user registration component 180. In embodiments, other criteria also may be presented for satisfaction by the user for registering with the decentralized application 28. Upon agreeing to the terms of use of the decentralized application 28 and satisfying any other criteria, the user registration component 180 registers the user as an authorized user for the decentralized application 28. To register the user, the user registration component 180 generates and transmits to at least one of the distributed nodes 68 of the blockchain system 36 a transaction to invoke the address registration function 156 of the entitlement contract 60 for the decentralized application 28 to add one or more addresses or other indicators of the user to the registered address list 152.

In other embodiments, the method(s) of registering depicted in or discussed in regard to FIGS. 10 and 11 may include only any subset of the steps of such method(s).

Figure 12:
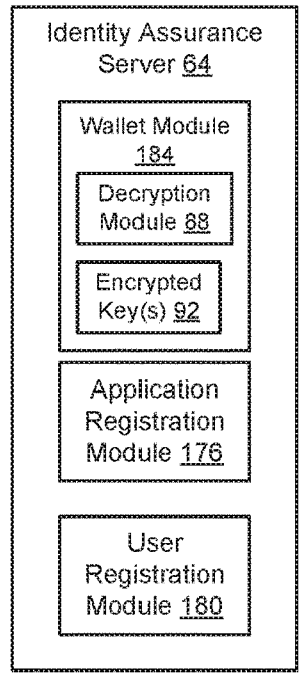
FIG. 12 is a schematic diagram depicting an embodiment of a server of the identity assurance system.

FIG. 12 depicts an exemplary embodiment of the identity assurance server 64 including the wallet module 184, the application registration module 176, and the user registration module 180.

The wallet module 184 includes the decryption module 88 and one or more encrypted keys 92. In embodiments, the encrypted keys 92 may be separately stored for use with different decentralized applications 28.

In other embodiments, the identity assurance server may include only any subset of the components or features depicted in or discussed in regard to FIG. 12.

The blockchain stored by the blockchain system includes an ordered plurality of blocks, starting from a genesis block to a most recently created block. Each block may include a header and a list of transactions incorporated into that block. For operation of the identity assurance system, the transactions may include, among others, a transaction deploying the DApp contract, a transaction deploying the registry contract, a transaction deploying the entitlement contract, one or more transactions addressed to execute restricted functions of the DApp contract, one or more transactions addressed to execute application registration functions of the registry contract, one or more transactions addressed to execute user registration functions of the entitlement contract, etc.

In embodiments, a web token system is used to protect access to components of the system for conducting transactions, such as the identity assurance sever and ports to the blockchain system. The web token system issues a time- and identity-limited web token to a user to access the protected components. Once the token has expired, a new token must be issued.

In embodiments, the system for conducting transactions 20 may include a different type of distributed transaction ledger system in place of the blockchain system 36, such as a distributed transaction ledger system having a data organization other than a blockchain, and embodiments of the associated methods of providing identity assurance discussed herein may use such a distributed transaction ledger system in place of the blockchain system 36. Such a distributed transaction ledger system may have a distributed structure similar to as depicted in FIG. 3, including a plurality of distributed nodes that may be organized as a peer-to-peer network. The distributed nodes of such a distributed transaction ledger system may include modules similar to as depicted in FIG. 4, such as a data storage module to store the data structures of the distributed transaction ledger system, a communication module, a virtual machine module, and a data creation module to create the data structures.

Additional embodiments of the decentralized application, identity assurance system, blockchain system, user system and associated methods of providing identity assurance discussed herein are possible. For example, any feature of any of the embodiments of the decentralized application, identity assurance system, blockchain system, user system and associated methods of providing identity assurance described herein may be used in any other embodiment of the decentralized application, identity assurance system, blockchain system, user system or associated methods of providing identity assurance. Also, embodiments of the decentralized application, identity assurance system, blockchain system, user system and associated methods of providing identity assurance may include only any subset of the components or features of the decentralized application, identity assurance system, blockchain system, user system and associated methods of providing identity assurance discussed herein.

What is claimed is:

1. A method of providing identity assurance for a decentralized application (DApp), the method comprising:
    executing, by at least one node of a distributed ledger system, program instructions of an entitlement smart contract stored on a ledger of the distributed ledger system, to:
        receive a call from a DApp smart contract stored on the ledger, the call including an indicator representing a user invoking the DApp smart contract;
        perform an entitlement checking function to determine whether a data structure of the entitlement smart contract includes the indicator, wherein the data structure is stored on the ledger, and performing the entitlement checking function includes reading the data structure on the ledger, and determining whether the data structure includes the indicator; and
        provide an output in response to the call to the DApp smart contract indicating whether the user is entitled to invoke the DApp smart contract based on the determining whether the data structure of the entitlement smart contract includes the indicator.

2. The method of claim 1, wherein the indicator representing the user invoking the DApp smart contract is an address signing a transaction to the DApp smart contract.

3. The method of claim 1, wherein performing the entitlement checking function includes:
    reading a list of indicators representing authorized users stored by the entitlement smart contract in the data structure on the ledger of the distributed ledger system; and
    determining whether the list includes the indicator.

4. The method of claim 3, wherein when the list includes the indicator, the provided output indicates that the user is entitled to invoke the DApp smart contract, and when the list does not includes the indicator, the provided output indicates that the user is not entitled to invoke the DApp smart contract.

5. The method of claim 1, wherein the call received by the entitlement smart contract from the DApp smart contract indicates a specific function of the DApp smart contract invoked by the user, and the provided output by the entitlement smart contract to the DApp smart contract indicates whether the user is authorized to invoke the specific function.

6. The method of claim 1, wherein the specific function of the DApp smart contract is a ledger modification function of the DApp smart contract.

7. A method of providing identity assurance for a decentralized application (DApp), the method comprising:
    executing, by at least one node of a distributed ledger system, program instructions of an entitlement smart contract stored on a ledger of the distributed ledger system, to:
        receive a transaction including an indicator of a user authorized to conduct transactions with a DApp smart contract stored on the ledger;
        write the indicator to a list of indicators representing authorized users stored by the entitlement smart contract in the data structure on the ledger of the distributed ledger system;
        receive a call from the DApp smart contract, the call including the indicator representing the user invoking the DApp smart contract; and
        provide an output in response to the call to the DApp smart contract indicating the user is entitled to invoke the DApp smart contract.

8. A method of providing identity assurance for a decentralized application (DApp), the method comprising:
    executing, by the at least one node of a distributed ledger system, program instructions of a registry smart contract stored on a ledger of the distributed ledger system, to:
        receive a call from a DApp smart contract stored on the ledger, the call including an indicator identifying the DApp; and
        provide an output to the DApp smart contract in response to the call indicating an address on the ledger corresponding to the entitlement smart contract; and
    executing, by at least one node of a distributed ledger system, program instructions of an entitlement smart contract stored on a ledger of the distributed ledger system, to:
        receive a call from the DApp smart contract, the call including an indicator representing a user invoking the DApp smart contract; and
        provide an output in response to the call to the DApp smart contract indicating whether the user is entitled to invoke the DApp smart contract.

9. The method of claim 8, wherein the registry smart contract performs a registry checking function to determine if the DApp smart contract is registered to use the entitlement smart contract, the registry checking function including:
    reading a list of registered applications stored on the ledger by the registry smart contract; and
    determining whether the list of applications includes the indicator identifying the DApp.

10. The method of claim 9, wherein when the list of registered applications includes the indicator identifying the DApp, the provided output by the registry smart contract to the DApp smart contract includes the address corresponding to the entitlement smart contract, and when the list of registered applications does not include the indicator identifying the DApp, the provided output by the registry smart contract to the DApp smart contract indicates that the DApp is not registered to use the entitlement contract.

11. The method of claim 8, wherein the registry smart contract performs an application registration function to:
    receive a transaction including the indicator of the DApp; and
    write the indicator of the DApp to the list of registered applications stored on the ledger by the registry smart contract.

12. A non-transitory machine-readable storage medium including program instructions, which when executed by a processor perform a method of providing identity assurance for a decentralized application (DApp), the method comprising:
    executing, by at least one node of a distributed ledger system, program instructions of an entitlement smart contract stored on a ledger of the distributed ledger system, to:
        receive a call from a DApp smart contract stored on the ledger, the call including an indicator representing a user invoking the DApp smart contract;
        perform an entitlement checking function to determine whether a data structure of the entitlement smart contract includes the indicator, wherein the data structure is stored on the ledger, and performing the entitlement checking function includes reading the data structure on the ledger, and determining whether the data structure includes the indicator; and
        provide an output in response to the call to the DApp smart contract indicating whether the user is entitled to invoke the DApp smart contract based on the determining whether the data structure of the entitlement smart contract includes the indicator.

13. The non-transitory machine-readable storage medium of claim 12, wherein the indicator representing the user invoking the DApp smart contract is an address signing a transaction to the DApp smart contract.

14. The non-transitory machine-readable storage medium of claim 12, wherein performing the entitlement checking function includes:
    reading a list of indicators representing authorized users stored by the entitlement smart contract in the data structure on the ledger of the distributed ledger system; and
    determining whether the list includes the indicator.

15. The non-transitory machine-readable storage medium of claim 12, the method further comprising:
    receiving by the entitlement smart contract a transaction including the indicator of the user authorized to conduct transactions with the DApp smart contract; and
    writing the indicator to the list of indicators representing authorized users stored by the entitlement smart contract in the data structure on the ledger of the distributed ledger system.

16. The non-transitory machine-readable storage medium of claim 12, the method further comprising executing, by the at least one node of the distributed ledger system, program instructions of a registry smart contract stored on the ledger of the distributed ledger system, to:
    receive a call from the DApp smart contract, the call including an indicator identifying the DApp; and
    provide an output to the DApp smart contract in response to the call indicating an address on the ledger corresponding to the entitlement smart contract.

17. The non-transitory machine-readable storage medium of claim 16, wherein the registry smart contract performs a registry checking function to determine if the DApp smart contract is registered to use the entitlement smart contract, the registry checking function including:
    reading a list of registered applications stored on the ledger by the registry smart contract; and
    determining whether the list of applications includes the indicator identifying the DApp.

18. The non-transitory machine-readable storage medium of claim 16, wherein the registry smart contract performs an application registration function to:
    receive a transaction including the indicator of the DApp; and
    write the indicator of the DApp to the list of registered applications stored on the ledger by the registry smart contract.

19. A system for providing identity assurance for a decentralized application (DApp), the system comprising:
    at least one processor; and
    at least one non-transitory machine-readable storage medium including program instructions, which when executed by the at least one processor cause the at least one processor to perform a method of providing the identity assurance for the DApp, the method including:
        executing, by at least one node of a distributed ledger system, program instructions of an entitlement smart contract stored on a ledger of the distributed ledger system, to:
            receive a call from a DApp smart contract stored on the ledger, the call including an indicator representing a user invoking the DApp smart contract;
            perform at entitlement checking function to determine whether a data structure of the entitlement smart contract includes the indicator, wherein the data structure is stored on the ledger, and performing the entitlement checking function includes reading the data structure on the ledger, and determining whether the data structure includes the indicator; and
            provide an output in response to the call to the DApp smart contract indicating whether the user is entitled to invoke the DApp smart contract based on the determining whether the data structure of the entitlement smart contract includes the indicator.

20. The system of claim 19, wherein performing the entitlement checking function includes:
    reading a list of indicators representing authorized users stored by the entitlement smart contract in the data structure on the ledger of the distributed ledger system; and
    determining whether the list includes the indicator;

wherein when the list includes the indicator, the provided output indicates that the user is entitled to invoke the DApp smart contract, and when the list does not includes the indicator, the provided output indicates that the user is not entitled to invoke the DApp smart contract.

21. The system of claim 19, the method further comprising executing, by the at least one node of the distributed ledger system, program instructions of a registry smart contract stored on the ledger of the distributed ledger system, to:
   receive a call from the DApp smart contract, the call including an indicator identifying the DApp; and
   provide an output to the DApp smart contract in response to the call indicating an address on the ledger corresponding to the entitlement smart contract.

22. The system of claim 21, wherein the registry smart contract performs a registry checking function to determine if the DApp smart contract is registered to use the entitlement smart contract, the registry checking function including:
   reading a list of registered applications stored on the ledger by the registry smart contract; and
   determining whether the list of applications includes the indicator identifying the DApp;
   wherein when the list of registered applications includes the indicator identifying the DApp, the provided output by the registry smart contract to the DApp smart contract includes the address corresponding to the entitlement smart contract, and when the list of registered applications does not include the indicator identifying the DApp, the provided output by the registry smart contract to the DApp smart contract indicates that the DApp is not registered to use the entitlement contract.

* * * * *